United States Patent
Hakola et al.

(10) Patent No.: US 8,989,389 B2
(45) Date of Patent: Mar. 24, 2015

(54) METHOD AND APPARATUS FOR DEVICE-TO-DEVICE KEY MANAGEMENT

(75) Inventors: Sami-Jukka Hakola, Kempele (FI); Timo Koskela, Oulu (FI); Henri Markus Koskinen, Espoo (FI)

(73) Assignee: Nokia Corporation, Espoo (FI)

( * ) Notice: Subject to any disclaimer, the term of this patent is extended or adjusted under 35 U.S.C. 154(b) by 242 days.

(21) Appl. No.: 13/634,841

(22) PCT Filed: Mar. 24, 2010

(86) PCT No.: PCT/IB2010/051300
§ 371 (c)(1),
(2), (4) Date: Sep. 13, 2012

(87) PCT Pub. No.: WO2011/117677
PCT Pub. Date: Sep. 29, 2011

(65) Prior Publication Data
US 2013/0013926 A1    Jan. 10, 2013

(51) Int. Cl.
*H04L 9/08* (2006.01)
*H04W 12/04* (2009.01)
*H04W 92/18* (2009.01)

(52) U.S. Cl.
CPC .............. *H04W 12/04* (2013.01); *H04W 92/18* (2013.01)
USPC ................. 380/279; 380/44; 380/45; 380/281

(58) Field of Classification Search
None
See application file for complete search history.

(56) References Cited

U.S. PATENT DOCUMENTS

| 7,181,015 | B2 * | 2/2007 | Matt ............................. 380/279 |
| 2004/0187001 | A1 | 9/2004 | Bousis |
| 2007/0253376 | A1 | 11/2007 | Bonta et al. |
| 2008/0095361 | A1 | 4/2008 | Wifvesson et al. |
| 2009/0287922 | A1 * | 11/2009 | Herwono et al. ............. 713/155 |
| 2009/0320102 | A1 | 12/2009 | Ou |

FOREIGN PATENT DOCUMENTS

| CN | 1518825 A | 8/2004 |
| CN | 101605240 A | 12/2009 |

OTHER PUBLICATIONS

Sesia et al., "LTE—The UMTS Long Term Evolution: From Theory to Practice", Second Edition, Sep. 6, 2011, 791 pages.
"3rd Generation Partnership Project; Technical Specification Group Radio Access Network; Evolved Universal Terrestrial Radio Access (E-UTRA) Radio Resource Control (RRC); Protocol specification (Release 9)", 3GPP TS 36.331, V9.0.0, Sep. 2009, pp. 1-213.
(Continued)

*Primary Examiner* — Minh Dinh
(74) *Attorney, Agent, or Firm* — Alston & Bird LLP

(57) ABSTRACT

Various methods for device-to-device key management are provided. One example method includes receiving a communication mode change command requesting a mode change to device-to-device communications, and generating a local device security key based on a secret key and a base value. The local device security key may be configured for use in device-to-device communications. The example method may also include receiving a security key combination value, and deconstructing the security key combination value using the local device security key to determine a peer device security key. The peer device security key may be configured for use in device-to-device communications. Similar and related example methods and example apparatuses are also provided.

20 Claims, 9 Drawing Sheets

(56) References Cited

OTHER PUBLICATIONS

"3rd Generation Partnership Project; Technical Specification Group Services and System Aspects; 3GPP System Architecture Evolution (SAE): Security Architecture; (Release 9)", 3GPP TS 33.401, V9.2.0, Dec. 2009, pp. 1-104.

International Search Report and Written Opinion received for corresponding Patent Cooperation Treaty Application No. PCT/IB2010/051300, dated Dec. 28, 2010, 15 pages.

"3rd Generation Partnership Project; Technical Specification Group Services and System Aspects; 3GPP System Architecture Evolution (SAE): Security Architecture; (Release 8)", 3GPP TS 33.401, V8.2.1, Dec. 2008, pp. 1-58.

"3rd Generation Partnership Project; Technical Specification Group Services and System Aspects; Rationale and Track of Security Decisions in Long Term Evolved (LTE) RAN / 3GPP System Architecture Evolution (SAE) (Release 8)", 3GPP TR 33.821, V8.0.0, Mar. 2009, pp. 1-137.

Office Action from corresponding Chinese Patent Application No. 201080065647.2, dated Aug. 8, 2014.

* cited by examiner

METHOD AND APPARATUS FOR DEVICE-TO-DEVICE KEY MANAGEMENT

RELATED APPLICATION

This application was originally filed as PCT Application No. PCT/IB2010/051300 filed Mar. 24, 2010.

TECHNICAL FIELD

Embodiments of the present invention relate generally to communications, and, more particularly, relate to a method and apparatus device-to-device key management.

BACKGROUND

The modern communications era has brought about a tremendous expansion of wireless networks. Various types of networking technologies have been developed resulting in unprecedented expansion of computer networks, television networks, telephony networks, and the like, fueled by consumer demand within a wireless communications environment. Wireless and mobile networking technologies have addressed related consumer demands, while providing more flexibility and immediacy of information transfer.

With the continued evolution of wireless communications technology, wireless communications in a device-to-device setting have become increasingly practical. Via a device-to-device communications, a physical network need not be a conduit for communications between the devices. Rather, the devices, such as cellular devices, may directly communicate with each other, for example, to reduce the communications load on the physical network. However, communications security should be considered within a device-to-device setting.

BRIEF SUMMARY

Example methods and example apparatuses are described herein that provide for device-to-device key management. One example method includes receiving a communication mode change command requesting a mode change to device-to-device communications and generating a local device security key based on a secret key and a base value. The local device security key may be configured for use in device-to-device communications. The example method may also include receiving a security key combination value, and deconstructing the security key combination value using the local device security key to determine a peer device security key. The peer device security key may also be configured for use in device-to-device communications.

An additional example embodiment is an apparatus configured for device-to-device key management. The example apparatus comprises at least one processor and at least one memory including computer program code, the at least one memory and the computer program code configured to, with the at least one processor, cause the apparatus to perform various functionality. The example apparatus may be caused to perform receiving a communication mode change command requesting a mode change to device-to-device communications and generating a local device security key based on a secret key and a base value. The local device security key may be configured for use in device-to-device communications. The example apparatus may also be caused to perform receiving a security key combination value, and deconstructing the security key combination value using the local device security key to determine a peer device security key. The peer device security key may also be configured for use in device-to-device communications.

Another example embodiment is a computer program product comprising a computer-readable storage medium having computer program code stored thereon, wherein execution of the computer program code causes an apparatus to perform various functionalities. Execution of the computer program code may cause an apparatus to perform receiving a communication mode change command requesting a mode change to device-to-device communications and generating a local device security key based on a secret key and a base value. The local device security key may be configured for use in device-to-device communications. Execution of the computer program code may also cause the apparatus to perform receiving a security key combination value, and deconstructing the security key combination value using the local device security key to determine a peer device security key. The peer device security key may also be configured for use in device-to-device communications.

Another example apparatus includes means for receiving a communication mode change command requesting a mode change to device-to-device communications and means for generating a local device security key based on a secret key and a base value. The local device security key may be configured for use in device-to-device communications. The example apparatus may also include means for receiving a security key combination value, and means for deconstructing the security key combination value using the local device security key to determine a peer device security key. The peer device security key may also be configured for use in device-to-device communications.

Another example method may include generating a first security key for a first device based on a first secret key and a first base value, where the first security key is configured for use in device-to-device communications from the first device. The example method may also include generating a second security key for a second device based on a second secret key and a second base value, where the second security key is also configured for use in device-to-device communications from the second device. The example method may further include combining the first security key with the second security key to generate a security key combination value, and causing sending of the security key combination value.

Another example apparatus comprises at least one processor and at least one memory including computer program code, the at least one memory and the computer program code configured to, with the at least one processor, cause the apparatus to perform various functionality. The example apparatus may be caused to perform generating a first security key for a first device based on a first secret key and a first base value, where the first security key is configured for use in device-to-device communications from the first device. The example apparatus may also be caused to perform generating a second security key for a second device based on a second secret key and a second base value, where the second security key is also configured for use in device-to-device communications from the second device. Further, the example apparatus may be caused to perform combining the first security key with the second security key to generate a security key combination value, and causing sending of the security key combination value.

Another example embodiment is a computer program product comprising a computer-readable storage medium having computer program code stored thereon, wherein execution of the computer program code causes an apparatus to perform various functionalities. Execution of the computer program code may cause an apparatus to perform generating a first security key for a first device based on a first secret key and a first base value, where the first security key is configured for use in device-to-device communications from the first device. Execution of the computer program code may also cause an apparatus to perform generating a second security key for a second device based on a second secret key and a second base value, where the second security key is also configured for use in device-to-device communications from the second device. Further, execution of the computer program code may also cause an apparatus to perform combining the first security key with the second security key to generate a security key combination value, and causing sending of the security key combination value.

Another example apparatus includes means for generating a first security key for a first device based on a first secret key and a first base value, where the first security key is configured for use in device-to-device communications from the first device. The example apparatus may also include means for generating a second security key for a second device based on a second secret key and a second base value, where the second security key is also configured for use in device-to-device communications from the second device. The example apparatus may further include means for combining the first security key with the second security key to generate a security key combination value, and means for causing sending of the security key combination value.

Another example method may include generating a first base value for determining a first security key for use with device-to-device communications from a first device, generating a second base value for determining a second security key for use with device-to-device communications from a second device, causing sending of a communication mode change command to the first device and the second device with the first base value and the second base value, causing sending of the first base value and the second base value to a key management network entity, and receiving a security key combination value from the key management network entity. The security key combination value may be a combination of the first security key and the second security key. The example method may also include causing sending of the security key combination value to the first device and the second device.

Another example apparatus comprises at least one processor and at least one memory including computer program code, the at least one memory and the computer program code configured to, with the at least one processor, cause the apparatus to perform various functionality. The example apparatus may be caused to perform generating a second base value for determining a second security key for use with device-to-device communications from a second device, causing sending of a communication mode change command to the first device and the second device with the first base value and the second base value, causing sending of the first base value and the second base value to a key management network entity, and receiving a security key combination value from the key management network entity. The security key combination value may be a combination of the first security key and the second security key. The example apparatus may also be caused to perform causing sending of the security key combination value to the first device and the second device.

Another example embodiment is a computer program product comprising a computer-readable storage medium having computer program code stored thereon, wherein execution of the computer program code causes an apparatus to perform various functionalities. Execution of the computer program code may cause an apparatus to perform generating a second base value for determining a second security key for use with device-to-device communications from a second device, causing sending of a communication mode change command to the first device and the second device with the first base value and the second base value, causing sending of the first base value and the second base value to a key management network entity, and receiving a security key combination value from the key management network entity. The security key combination value may be a combination of the first security key and the second security key. Execution of the computer program code may also cause an apparatus to perform causing sending of the security key combination value to the first device and the second device.

Another example apparatus includes means for generating a first base value for determining a first security key for use with device-to-device communications from a first device, means for generating a second base value for determining a second security key for use with device-to-device communications from a second device, means for causing sending of a communication mode change command to the first device and the second device with the first base value and the second base value, means for causing sending of the first base value and the second base value to a key management network entity, and means for receiving a security key combination value from the key management network entity. The security key combination value may be a combination of the first security key and the second security key. The example apparatus may also include means for causing sending of the security key combination value to the first device and the second device.

BRIEF DESCRIPTION OF THE DRAWING(S)

Having thus described example embodiments of the invention in general terms, reference will now be made to the accompanying drawings, which are not necessarily drawn to scale, and wherein:

DETAILED DESCRIPTION

Figure 1:
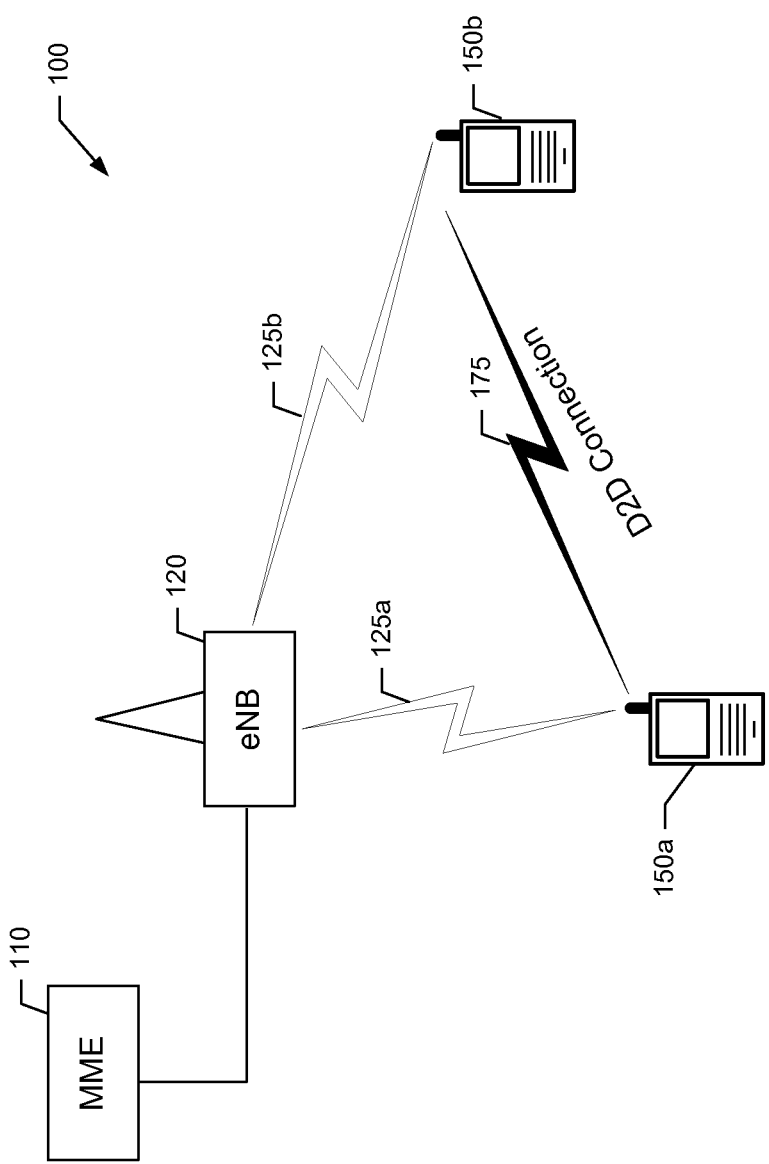
FIG. 1 illustrates a communications system according to an example embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Various example embodiments of the present invention are directed to the generation, sharing, and utilization of security keys in the context of device-to-device (D2D) communications. D2D communications may be implemented in, for example, a cellular network, such as, for example, a Long Term Evolution (LTE)-based network. In D2D communications, the transmissions can be provided and received by wireless devices directly to or from each other at the physical layer, without using an access point or base station (e.g., evolved Node B (eNB)) as a conduit for communications.

An example of a D2D implementation in an LTE network involves the implementation of machine-to-machine (M2M) communications via LTE resources. In an example scenario, a device or mobile terminal may be connected to the LTE network, but may also act as a router for machines, sensors, or the like, that are equipped with an LTE radio but are not connected for example, to the evolved UMTS (Universal Mobile Telecommunications System) Terrestrial Radio Access Network (e-UTRAN) air interface. The machines or sensors may utilize D2D communications, for example, under LTE, to gain access to the LTE network through the device or mobile terminal.

In an LTE environment, both control and user plane data may be transmitted over an air interface using encrypted or secured connections. In this regard, the encryption or security may be realized via the use of user equipment (UE) (e.g., mobile terminal) specific and corresponding network side security or encryption keys. The keys may be generated from a secret or root key, such as an access security management entity key ($K_{ASME}$), that is, for example, known only by the UE and a mobility management entity (MME)/home subscriber server (HSS). In non-D2D communications schemes, the encryption keys are not transmitted over an air interface for security purposes.

To support D2D communications in a secure fashion, similar techniques may be implemented. For example, each of the D2D devices may generate or acquire a security key for itself and for another device and cipher communications using its own D2D security key, while also deciphering communications provided by another device using the other device's D2D security key. However, according to some example embodiments, for security purposes each respective UE may generate or obtain the D2D security key of another device, without transmitting the D2D security key over an air interface. As such, various example embodiments of the present invention, describe mechanisms for sharing D2D security keys, while also avoiding the transmission of the D2D security keys via an air interface.

FIG. 1 illustrates an example communications system 100. The system 100 may support an LTE communications environment via e-UTRAN and D2D connections. The communications system 100 includes a mobility management entity (MME) 110, an evolved Node B (eNB 120), and mobile terminals 150a and 150b. The MME 110 may be a node (e.g., server) in, for example, an LTE network, that performs key control. In some example embodiments, the MME 110 also performs or facilitates the performance of user authentication, performs idle mode tracking of UEs (e.g., mobile terminals 150), performs paging procedures for retransmissions, facilitates the activation and deactivation of bearers, and selects the serving gateway for a UE at initial attachment and during handovers involving core network node relocation. The MME 110 may also be one type of key management network entity that handles security key management. The eNB 120 may be an example of a wireless access point that provides access to the cellular network via an air interface such as, for example, e-UTRAN. The eNB 120 may operate to support connections to the LTE network by the mobile terminals 150a and 150b. The mobile terminals 150 may be examples of UEs that are configured to support, for example, both cellular and D2D communications. In the communications network 100, mobile terminal 150a is depicted as having a network connection 125a with the eNB 120 and a D2D connection 175 with the mobile terminal 150b. Similarly, mobile terminal 150b is depicted as having a network connection 125b with the eNB 120 and a D2D connection 175 with the mobile terminal 150a.

Figure 2:
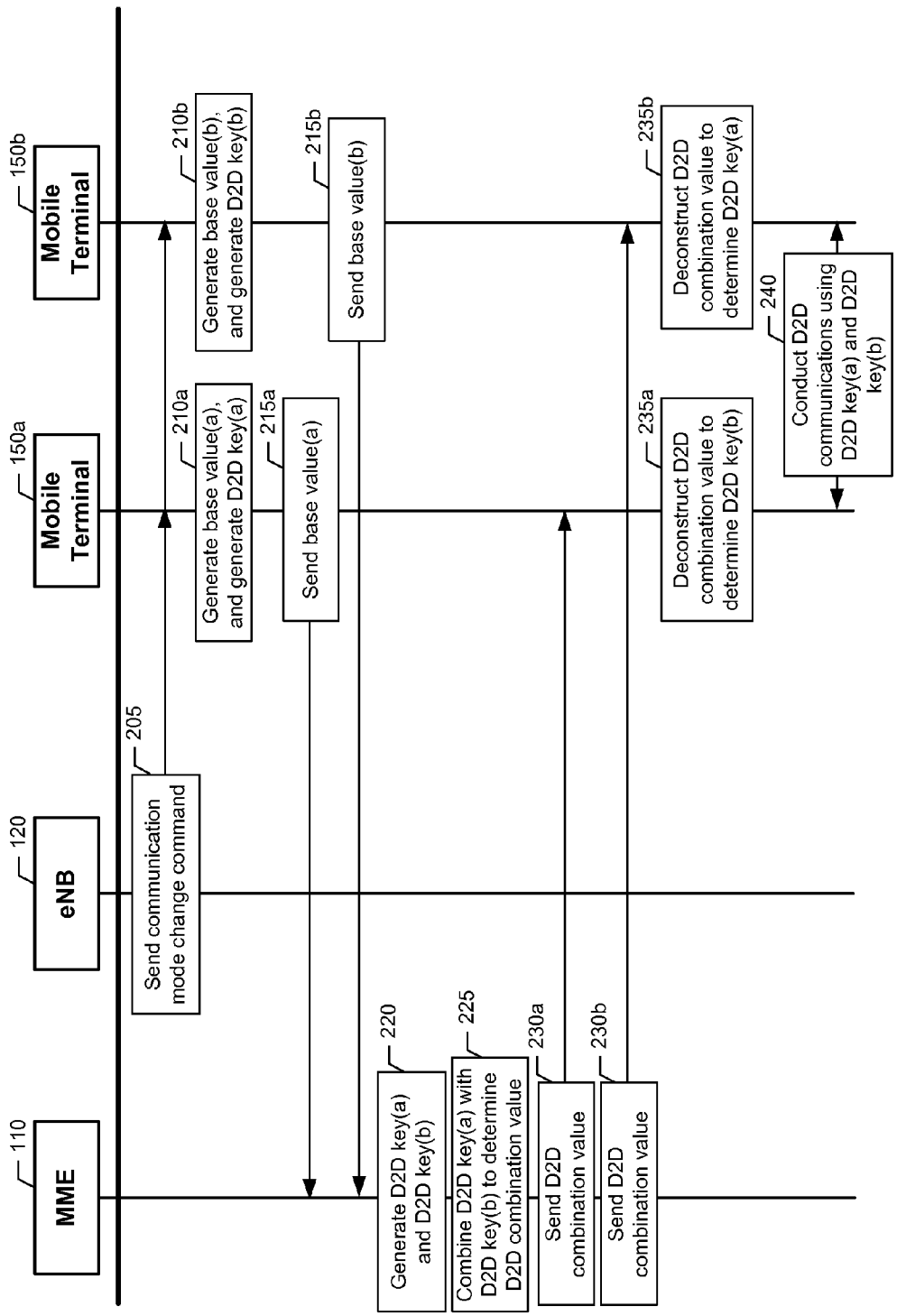
FIG. 2 illustrates a flowchart and signaling diagram for device-to-device key management according to an example embodiment of the present invention.
Figure 3:
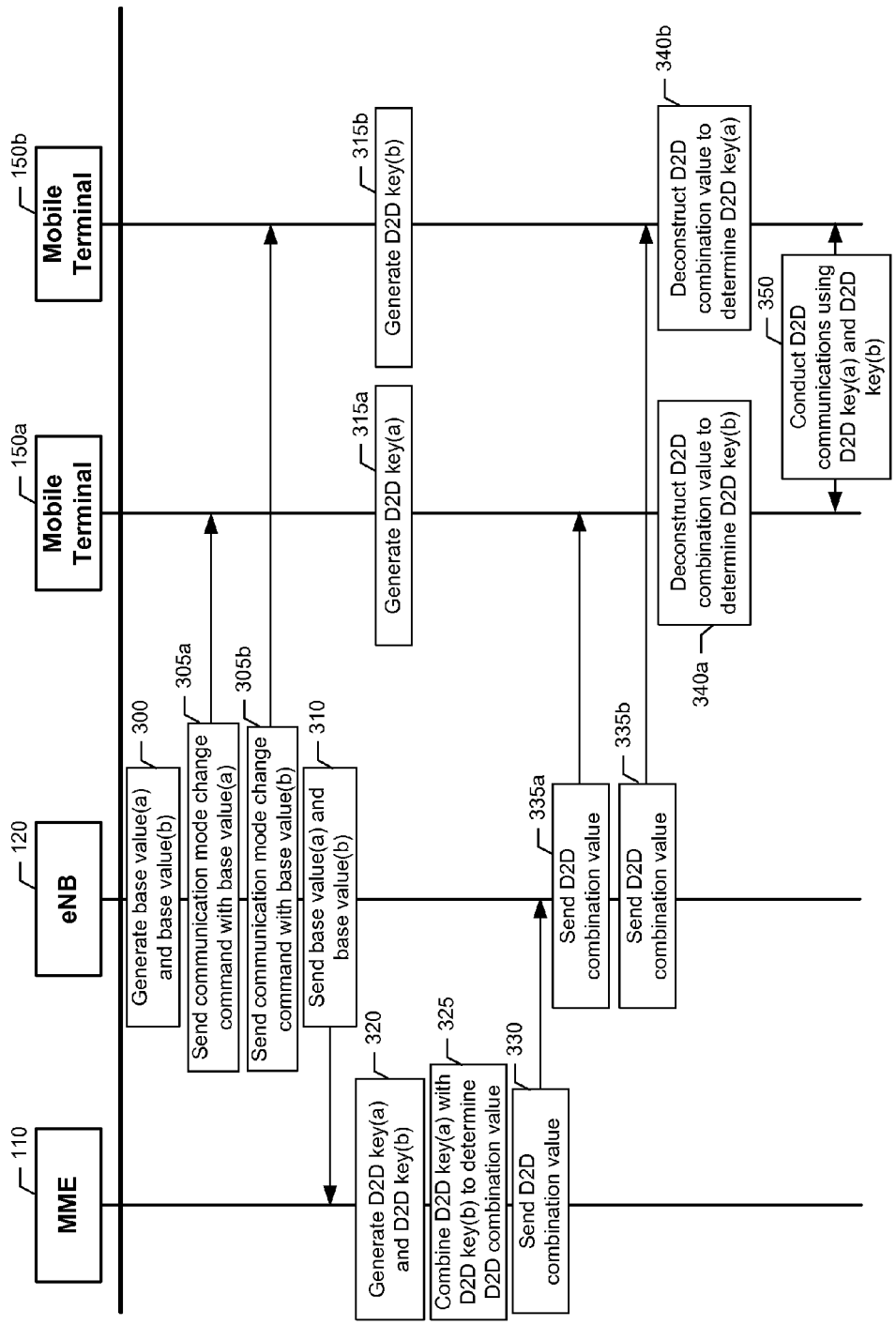
FIG. 3 illustrates a flowchart and signaling diagram for device-to-device key management according to another example embodiment of the present invention.
Figure 4:
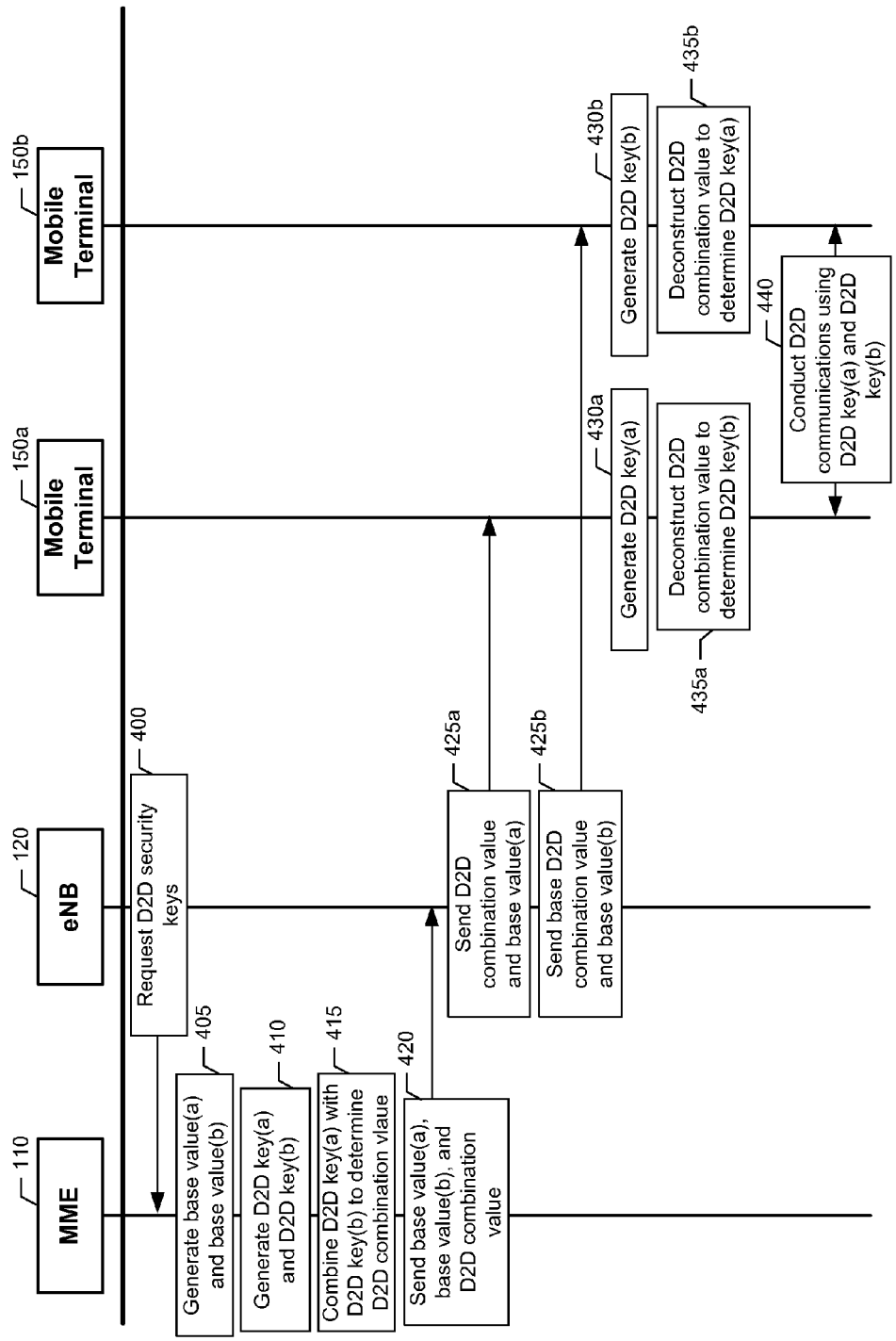
FIG. 4 illustrates a flowchart and signaling diagram for device-to-device key management according to another example embodiment of the present invention.

FIGS. 2-4 illustrate various example embodiments of the present invention in the form flowchart signaling diagrams involving the operations of the MME 110, the eNB 120, and the mobile terminals 150. In this regard, the example embodiments described in FIGS. 2-4 are configured to support the generation and sharing of D2D security keys, in some example embodiments, without the transmission of a D2D security key via an air interface.

FIG. 2 illustrates one example embodiment for D2D key management where the MME distributes information used to share peer D2D security keys. At 205, the eNB 120 sends a communications mode change command to the mobile terminals 150 (either in separate or shared messages) to trigger the mobile terminals 150 to transition to a D2D communications session, and, for example begin to establish the D2D connection 175. According to some example embodiments, the mobile terminals may be transitioning from a cellular connection to a D2D connection. The communications mode change command may be provided by the eNB 120 in the form of a radio resource control (RRC) reconfiguration command.

In response to the mode change command, the mobile terminals 150 may be configured to generate base values and use the base values to generate respective D2D security keys at 210a and 210b. In this regard, mobile terminal 150a may be configured to generate a base value$_a$, which may be a random or pseudo-random number, and implement a key derivation function using a secret key (e.g., $K_{ASME,a}$) and the base value$_a$ to generate a D2D security key$_a$ ($K_{D2D,a}$) for use with D2D communications originating from mobile terminal 150a. In some example embodiments, the secret key may be unique to the particular UE, but known by the UE and the MME. Similarly, mobile terminal 150b may be configured to generate a base value$_b$, which may be a random or pseudo-random number, and implement a key derivation function using a secret key (e.g., $K_{ASME,b}$) and the base value$_b$ to generate a D2D security key$_b$ ($K_{D2D,b}$) for use with D2D communications originating from mobile terminal 150b.

The mobile terminals 150, at 215a and 215b, may be configured to send their respective base values to the MME 110. The transmissions of the base values may be sent to the MME 110 as secured messages and/or via a secured connection between each mobile terminal 150 and the MME 110. In some example embodiments, only the base values are transmitted to the MME 110 and not the D2D security keys for security reasons. The transmissions of the base values may, according to some example embodiments, be received by the eNB 120 and the eNB 120 may be configured to inform the MME 110 about the incoming message that include the base values. Alternatively, the messages including a base value may also include an indication (e.g., a data indication) that a D2D connection is being prepared. In some example embodiments, the messages including the base values may also include indications of which UEs will be involved in the D2D connection.

In response to receiving the base values, the MME 110 may be configured to, at 220, generate D2D security key$_a$ and D2D security key$_b$ using the same secret key as used by the mobile terminals (e.g., $K_{ASME,n}$ where n indicates the UE) via, for example, a key derivation function. The MME 110 may also be configured to combine D2D security key$_a$ with D2D security key$_b$ to generate or determine a D2D security key combination value at 225. According to some example embodiments, the procedure for combining D2D security key$_a$ with D2D security key$_b$ may include performing an exclusive-or operation on the security keys. At 230a and 230b, the MME 110 may be configured to send the D2D security key combination value to mobile terminals 150. In this regard, according to some example embodiments, the MME 110 may send the D2D security key combination value to each of the mobile terminals 150 separately, via individualized, secured connections to each respective mobile terminal 150.

In response to receiving the D2D security key combination value, the mobile terminals 150 may be configured to deconstruct the D2D security key combination value to determine a peer device's D2D security key at 235a and 235b. In this regard, mobile terminal 150a may deconstruct the D2D security key combination value, using, for example, its own D2D security key$_a$, to determine a peer device's D2D security key (e.g., mobile terminal 150b's D2D security key$_b$). Similarly, mobile terminal 150b may deconstruct the D2D security key combination value, using, for example, its own D2D security key$_b$, to determine a peer device's D2D security key (e.g., mobile terminal 150a's D2D security key$_a$). To deconstruct the D2D security key combination value, the mobile terminals 150 may be configured to perform an exclusive-or operation on the D2D security key combination value using the mobile terminal's own (local) security key to determine the D2D security key of a peer device. According to some example embodiments, the exclusive-or operations performed at the MME 110 and the mobile terminals 150 allow for information related to the D2D security keys to be transmitted over an air interface in a manner that may be decipherable only if a device has a D2D security key that was used in the combining process.

As a result, each mobile terminal 150 may be in possession of its own D2D security key and the D2D security key of a peer device, without having transmitted a security key over an air interface. Accordingly, the mobile terminals 150, at 240, may conduct communications using the D2D security keys. In this regard, a mobile terminal may use its local D2D security key to cipher outgoing communications and use the peer device's D2D security key to decipher incoming communications from the peer device.

FIG. 3 illustrates another example embodiment for D2D key management where the eNB distributes information used to share the peer D2D security keys. At 300, in response to a decision to transition mobile terminals 150 to a D2D connection, the eNB 120 may be configured to generate base values (e.g., base value$_a$ and base value$_b$), which may be random or pseudo-random numbers. The eNB 120 may be configured to subsequently send base value$_a$ to mobile terminal 150a and base value$_b$ to mobile terminal 150b, at 305a and 305b, respectively. The base values may be sent with a communication mode change command to trigger the mobile terminals 150 to transition to a D2D communications session, and, for example begin to establish the D2D connection 175. According to some example embodiments, the mobile terminals may be transitioning from a cellular connection to a D2D connection. The communications mode change command may be provided by the eNB 120 in the form of a radio resource control (RRC) reconfiguration command. Further, the mode change command may be provided in an individualized message for each mobile terminal 150.

The eNB 120 may also send the base values to the MME 110, at 310. In response to receiving the base values, the MME 110 may be configured to, at 320, generate D2D security key$_a$ and D2D security key$_b$ using the same secret key as used by the mobile terminals (e.g., $K_{ASME,n}$) via, for example, a key derivation function. The MME 110 may also be configured to combine D2D security key$_a$ with D2D security key$_b$ to generate or determine a D2D security key combination value at 325. According to some example embodiments, the procedure for combining D2D security key$_a$ with D2D security key$_b$ may include performing an exclusive-or operation on the security keys. At 330, the MME 110 may be configured to send the D2D security key combination value to the eNB 120.

The mobile terminals 150 may also be configured to generate their respective D2D security keys. In response to the mode change command, the mobile terminals 150 may be configured to use the base values provided by the eNB 120 to generate respective D2D security keys at 315a and 315b, respectively. In this regard, mobile terminal 150a may be configured to implement a key derivation function using a secret key (e.g., $K_{ASME,a}$) and the base value$_a$, which may be a random or pseudo-random number, and generate a D2D security key$_a$ ($K_{D2D,a}$) for use with D2D communications originating from mobile terminal 150a. In some example embodiments, the secret key may be unique to the particular UE, but known by the UE and the MME. Similarly, mobile terminal 150b may be configured to implement a key derivation function using a secret key (e.g., $K_{ASME,b}$) and the base value$_b$, which may be a random or pseudo-random number, and generate a D2D security key$_b$ ($K_{D2D,b}$) for use with D2D communications originating from mobile terminal 150b.

In response to receiving the D2D security key combination value, the eNB 120, at 335a and 335b, may be configured to send the D2D security key combination value to mobile terminals 150. In this regard, according to some example embodiments, the eNB 120 may send the D2D security key combination value to each of the mobile terminals 150 separately via individualized, secured connections to each respective mobile terminal 150.

In response to receiving the D2D security key combination value, the mobile terminals 150 may be configured to deconstruct the D2D security key combination value to determine a peer device's D2D security key at 340a and 340b. In this regard, mobile terminal 150a may deconstruct the D2D security key combination value, using, for example, its own D2D security key, to determine a peer device's D2D security key (e.g., mobile terminal 150b's D2D security key). Similarly, mobile terminal 150b may deconstruct the D2D security key combination value, using, for example, its own D2D security key, to determine a peer device's D2D security key (e.g., mobile terminal 150a's D2D security key). To deconstruct the D2D security key combination value, the mobile terminals 150 may be configured to perform an exclusive-or operation on the D2D security key combination value using the mobile terminal's own (local) security key to determine the D2D security key of a peer device. According to some example embodiments, the exclusive-or operations performed at the MME 110 and the mobile terminals 150 allow for information related to the D2D security keys to be transmitted over an air interface in a manner that may be decipherable only if a device has a D2D security key that was used in the combining process.

As a result, each mobile terminal 150 may be in possession of its own D2D security key and the D2D security key of a peer device, without having transmitted a security key over an air interface. Accordingly, the mobile terminals 150, at 350, may conduct communications using the D2D security keys. In this regard, a mobile terminal may use its local D2D security key to cipher outgoing communications and use the peer device's D2D security key to decipher incoming communications from the peer device.

FIG. 4 illustrates another example embodiment for D2D key management where the eNB distributes information used to share the peer D2D security keys, and a reduction in signaling. At 400, the eNB 120 determines that the mobile terminals 150 should transition to a D2D connection, and the eNB 120 sends a request for D2D security keys to the MME 110. In response to the request from eNB 120, the MME 110, at 405, may be configured to generate the base values (e.g., base value$_a$ and base value$_b$), which may be random or pseudo-random numbers. At 410, the MME 110 may be configured to generate D2D security key$_a$ and D2D security key$_b$ using the same secret key as used by the mobile terminals (e.g., $K_{ASME,n}$) via, for example, a key derivation function. The MME 110 may also be configured to combine D2D security key$_a$ with D2D security key$_b$ to generate or determine a D2D security key combination value at 415. According to some example embodiments, the procedure for combining D2D security key$_a$ with D2D security key$_b$ may include performing an exclusive-or operation on the security keys. At 420, the MME 110 may be configured to send the base values (e.g., base value$_a$ and base value$_b$) and the D2D security key combination value to the eNB 120.

In response to receiving the D2D security key combination value, the eNB 120, at 425a and 425b, may be configured to send the D2D security key combination value and the respective base values to mobile terminals 150. In this regard, according to some example embodiments, the eNB 120 may send base value$_a$ and the D2D security key combination value to mobile terminal 150a via individualized, secured connection with a communication mode change command (e.g., RRC message) at 425a. At 425b, according to some example embodiments, the eNB 120 may send base value$_b$ and the D2D security key combination value to mobile terminal 150b via individualized, secured connection with a communication mode change command (e.g., RRC message). The communications mode change commands may trigger the mobile terminals 150 to transition to a D2D communications session, and, for example begin to establish the D2D connection 175. According to some example embodiments, the mobile terminals may be transitioning from a cellular connection to a D2D connection.

In response to receipt of the messages at 425a and 425b, the mobile terminals 150 may be configured to generate their respective D2D security keys. In this regard, the mobile terminals 150 may be configured to use the base values provided by the eNB 120 to generate respective D2D security keys at 430a and 430b, respectively. Mobile terminal 150a may be configured to implement a key derivation function using a secret key (e.g., $K_{ASME,a}$) and the base value$_a$, which may be a random or pseudo-random number, and generate a D2D security key$_a$ ($K_{D2D,a}$) for use with D2D communications originating from mobile terminal 150a. In some example embodiments, the secret key may be unique to the particular UE, but known by the UE and the MME. Similarly, mobile terminal 150b may be configured to implement a key derivation function using a secret key (e.g., $K_{ASME,b}$) and the base value$_b$, which may be a random or pseudo-random number, and generate a D2D security key$_b$ ($K_{D2D,b}$) for use with D2D communications originating from mobile terminal 150a.

The mobile terminals 150 may also be configured to deconstruct the D2D security key combination value to determine a peer device's D2D security key at 435a and 435b. In this regard, mobile terminal 150a may deconstruct the D2D security key combination value, using, for example, its own D2D security key$_a$, to determine a peer device's D2D security key (e.g., mobile terminal 150b's D2D security key$_b$). Similarly, mobile terminal 150b may deconstruct the D2D security key combination value, using, for example, its own D2D security key$_b$, to determine a peer device's D2D security key (e.g., mobile terminal 150a's D2D security key$_a$). To deconstruct the D2D security key combination value, the mobile terminals 150 may be configured to perform an exclusive-or operation on the D2D security key combination value using the mobile terminal's own (local) security key to determine the D2D security key of a peer device. According to some example embodiments, the exclusive-or operations performed at the MME 110 and the mobile terminals 150 allow for information related to the D2D security keys to be transmitted over an air interface in a manner that may be decipherable only if a device has a D2D security key that was used in the combining process.

As a result, each mobile terminal 150 may be in possession of its own D2D security key and the D2D security key of a peer device, without having transmitted a security key over an air interface. Accordingly, the mobile terminals 150, at 440, may conduct communications using the D2D security keys. In this regard, a mobile terminal may use its local D2D security key to cipher outgoing communications and use the peer device's D2D security key to decipher incoming communications from the peer device.

Figure 5:
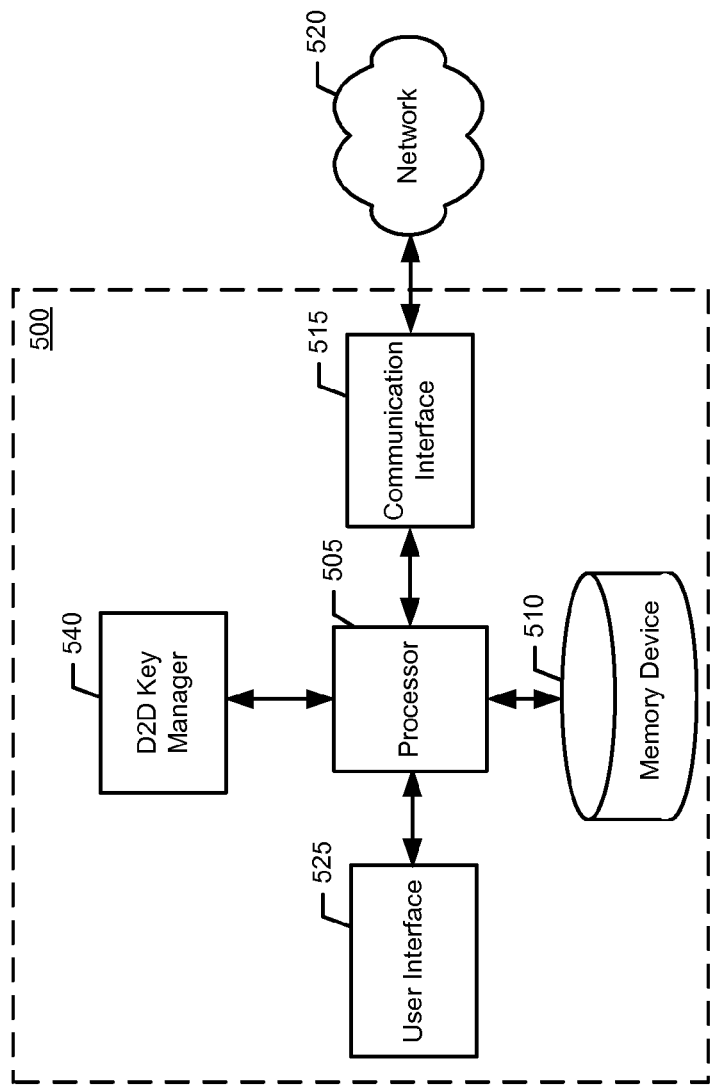
FIG. 5 illustrates a block diagram of an apparatus and associated system for device-to-device key management according to an example embodiment of the present invention.
Figure 6:
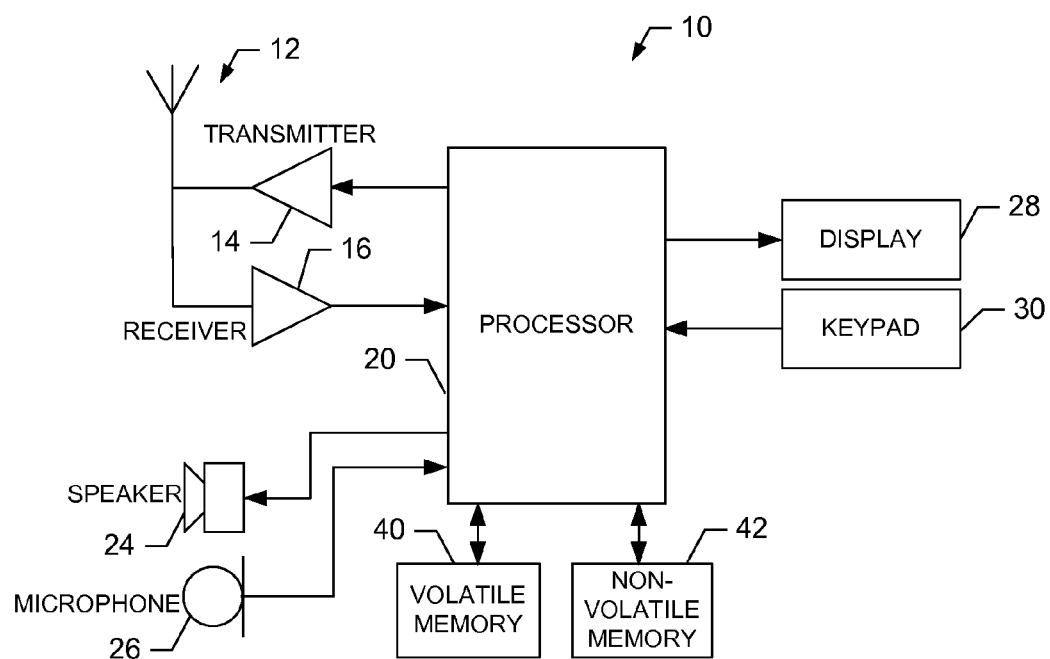
FIG. 6 illustrates a block diagram of a mobile terminal configured for device-to-device key management according to an example embodiment of the present invention.

The description provided above and generally herein illustrates example methods, example apparatuses, and example computer program products for device-to-device key management. FIG. 5 depicts example apparatuses that are configured to perform various functionalities as described herein, such as those described with respect to operation and configuration of a key management network entity (e.g., MME 110), an access point (e.g., eNB 120), or a terminal (e.g., mobile terminals 150), as described with respect to FIGS. 1-4. FIG. 6 may be configured to operate in accordance with one of the mobile terminals 150.

Referring now to FIG. 5, an example embodiment of the present invention is depicted as apparatus 500. Via different configurations of the D2D key manager 540, the apparatus 500 may be configured to perform the functionality of a key management network entity (e.g., MME 110), an access point (e.g., eNB 120), a terminal (e.g., mobile terminals 150), or combinations thereof. Apparatus 500 may, be embodied as, or included as a component of, a communications device with wired or wireless communications capabilities. In some example embodiments, the apparatus 500 may be part of a communications device, such as a stationary or a mobile communications terminal. As a stationary communications terminal, the apparatus 500 may be part of, or embodied as, a server, a computer, an access point (e.g., base station), communications switching device, or the like. As a mobile device, the apparatus 500 may be a mobile and/or wireless communications node such as, for example, a mobile and/or wireless server, computer, access point, communications switching device, handheld device (e.g., telephone, portable digital assistant (PDA), mobile television, gaming device, camera, video recorder, audio/video player, radio, and/or a global positioning system (GPS) device), any combination of the aforementioned, or the like. Regardless of the type of communications device, apparatus 500 may also include computing capabilities.

The example apparatus 500 includes or is otherwise in communication with a processor 505, a memory device 510, an Input/Output (I/O) interface 506, a communications interface 515, and a D2D key manager 540. The processor 505 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 505 may be representative of a plurality of processors, or one or more multiple core processors, operating in concert. Further, the processor 505 may be comprised of a plurality of transistors, logic gates, a clock (e.g., oscillator), other circuitry, and the like to facilitate performance of the functionality described herein. The processor 505 may, but need not, include one or more accompanying digital signal processors. In some example embodiments, the processor 505 is configured to execute instructions stored in the memory device 510 or instructions otherwise accessible to the processor 505. The processor 505 may be configured to operate such that the processor causes the apparatus 500 to perform various functionalities described herein.

Whether configured as hardware or via instructions stored on a computer-readable storage medium, or by a combination thereof, the processor 505 may be an entity capable of performing operations according to embodiments of the present invention while configured accordingly. Thus, in example embodiments where the processor 505 is embodied as, or is part of, an ASIC, FPGA, or the like, the processor 505 is specifically configured hardware for conducting the operations described herein. Alternatively, in example embodiments where the processor 505 is embodied as an executor of instructions stored on a computer-readable storage medium, the instructions specifically configure the processor 505 to perform the algorithms and operations described herein. In some example embodiments, the processor 505 is a processor of a specific device (e.g., a communications server) configured for employing example embodiments of the present invention by further configuration of the processor 505 via executed instructions for performing the algorithms, methods, and operations described herein.

The memory device 510 may be one or more computer-readable storage media that may include volatile and/or non-volatile memory. In some example embodiments, the memory device 510 includes Random Access Memory (RAM) including dynamic and/or static RAM, on-chip or off-chip cache memory, and/or the like. Further, memory device 510 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 510 may include a cache area for temporary storage of data. In this regard, some or all of memory device 510 may be included within the processor 505. Further, the memory device 510 may be configured to store information, data, applications, computer-readable program code instructions, and/or the like for enabling the processor 505 and the example apparatus 500 to carry out various functions in accordance with example embodiments of the present invention described herein. For example, the memory device 510 could be configured to buffer input data for processing by the processor 505. Additionally, or alternatively, the memory device 510 may be configured to store instructions for execution by the processor 505.

The I/O interface 506 may be any device, circuitry, or means embodied in hardware, software, or a combination of hardware and software that is configured to interface the processor 505 with other circuitry or devices, such as the communications interface 515. In some example embodiments, the processor 505 may interface with the memory 510 via the I/O interface 506. The I/O interface 506 may be configured to convert signals and data into a form that may be interpreted by the processor 505. The I/O interface 506 may also perform buffering of inputs and outputs to support the operation of the processor 505. According to some example embodiments, the processor 505 and the I/O interface 506 may be combined onto a single chip or integrated circuit configured to perform, or cause the apparatus 500 to perform, various functionalities of the present invention.

The communication interface 515 may be any device or means embodied in either hardware, a computer program product, or a combination of hardware and a computer program product that is configured to receive and/or transmit data from/to a network 520 and/or any other device or module in communication with the example apparatus 500. The communications interface may be configured to communicate information via any type of wired or wireless connection, and via any type of communications protocol, such as communications protocol that support cellular communications. According to various example embodiments, the communication interface 515 is configured to support the transmission and reception of communications in cellular networks, such as, for example, in a Long Term Evolution (LTE) environment using, for example, an evolved UMTS (Universal Mobile Telecommunications System) Terrestrial Radio Access Network (e-UTRAN) air interface. In this regard, the communications interface 515 may be configured to support device-to-device communications in, for example, LTE-based networks. Processor 505 may also be configured to facilitate communications via the communications interface by, for example, controlling hardware included within the communications interface 515. In this regard, the communication interface 515 may include, for example, communications driver circuitry (e.g., circuitry that supports wired communications via, for example, fiber optic connections), one or more antennas, a transmitter, a receiver, a transceiver and/or supporting hardware, including, for example, a processor for enabling communications. Via the communication interface 515, the example apparatus 500 may communicate with various other network entities in a device-to-device fashion and/or via indirect communications via a base station, access point, server, gateway, router, or the like.

The D2D key manager 540 of example apparatus 500 may be any means or device embodied, partially or wholly, in hardware, a computer program product, or a combination of hardware and a computer program product, such as processor 505 implementing stored instructions to configure the example apparatus 500, memory device 510 storing executable program code instructions configured to carry out the functions described herein, or a hardware configured processor 505 that is configured to carry out the functions of the D2D key manager 540 as described herein. In an example embodiment, the processor 505 includes, or controls, the D2D key manager 540. The D2D key manager 540 may be, partially or wholly, embodied as processors similar to, but separate from processor 505. In this regard, the D2D key manager 540 may be in communication with the processor 505. In various example embodiments, the D2D key manager 540 may, partially or wholly, reside on differing apparatuses such that some or all of the functionality of the D2D key manager 540 may be performed by a first apparatus, and the remainder of the functionality of the D2D key manager 540 may be performed by one or more other apparatuses.

The D2D key manager 540 may be configured to perform the functionality described with respect to FIGS. 1-4, or cause apparatus 500 to perform the functionality described with respect to FIGS. 1-4, according to various example embodiments. In this regard, for example, based on the configuration of the D2D key manager 540, the apparatus 500 may be configured to perform the functionality of a key management network entity (e.g., MME 110), an access point (e.g., eNB 120), or a terminal (e.g., mobile terminals 150).

Further, the apparatus 500 and the processor 505 may be configured to perform the following functionality via D2D key manager 540. In this regard, the D2D key manager 540 may be configured to cause the processor 505 and/or the apparatus 500 to perform various functionalities, such as those depicted in the flowcharts of FIGS. 7-9 and as generally described herein.

Figure 7:
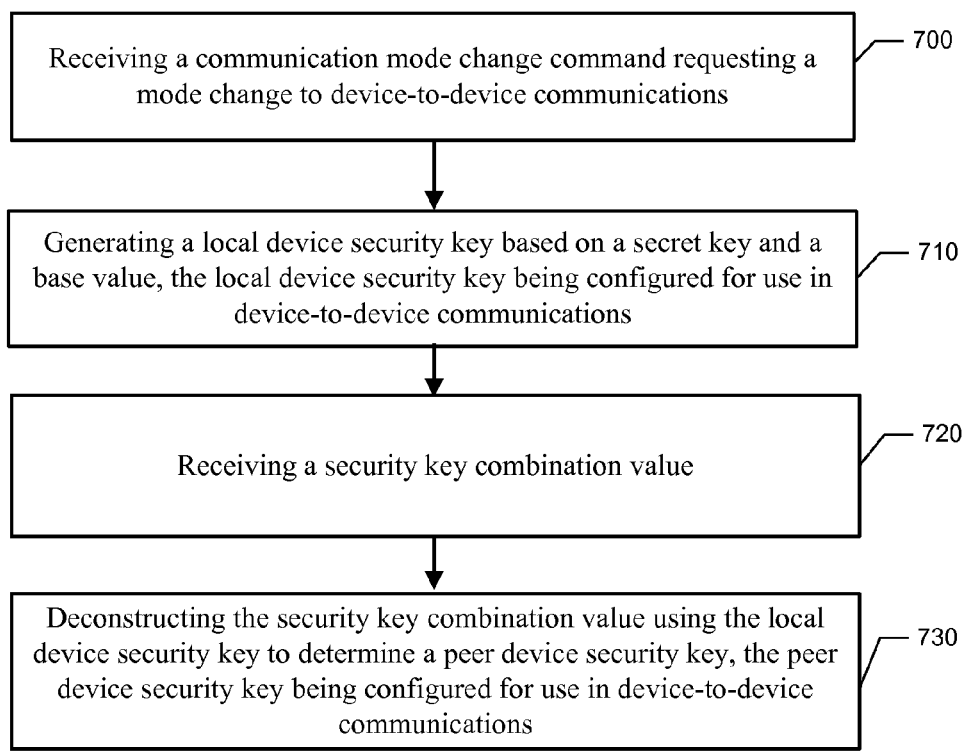
FIG. 7 illustrates a flow chart of a method for device-to-device key management according to an example embodiment of the present invention.

For example, with reference to FIG. 7, when the D2D key manager 540 is configured to cause the apparatus 500 to operate as a terminal, such as mobile terminals 150, D2D key manager 540 may be configured to perform the following functionality. The D2D key manager 540 may be configured to receive a communication mode change command requesting a mode change to device-to-device communications at 700. The D2D key manager 540 may also be configured to generate, at 710, a local device security key based on a secret key and a base value. The local device security key may be configured for use in device-to-device communications. The D2D key manager 540 may also be configured to receive a security key combination value, at 720, and deconstruct the security key combination value using the local device security key to determine a peer device security key at 730. The peer device security key may be configured for use in device-to-device communications.

According to some example embodiments, the D2D key manager 540 may be configured to generate the local device security key based on the secret key and the base value, where the base value is a random or pseudo-random number. Further, in some example embodiments, the D2D key manager 540 may be configured to generate or receive the base value (e.g., the base value may be received from a mobility management entity), and cause sending of the base value to a key management network entity, which may be a mobility management entity. In some example embodiments, the D2D key manager 540 may be configured to implement an exclusive-or operation on the security key combination value to determine the peer device security key. Further, in some example embodiments, the D2D key manager 540 may be configured to receive the security key combination value via a dedicated, secure connection between the sending entity and a receiving entity. According to some example embodiments, the communication mode change command, the base value, and the security key combination value are received in a common message, or according to some example embodiments, the communication mode change command and the base value may be received in a common message individualized for the receiving entity. The D2D key manager 540 may also be configured to cipher outgoing device-to-device communications using the local device security key, and decipher incoming device-to-device communications using the peer device security key.

Figure 8:
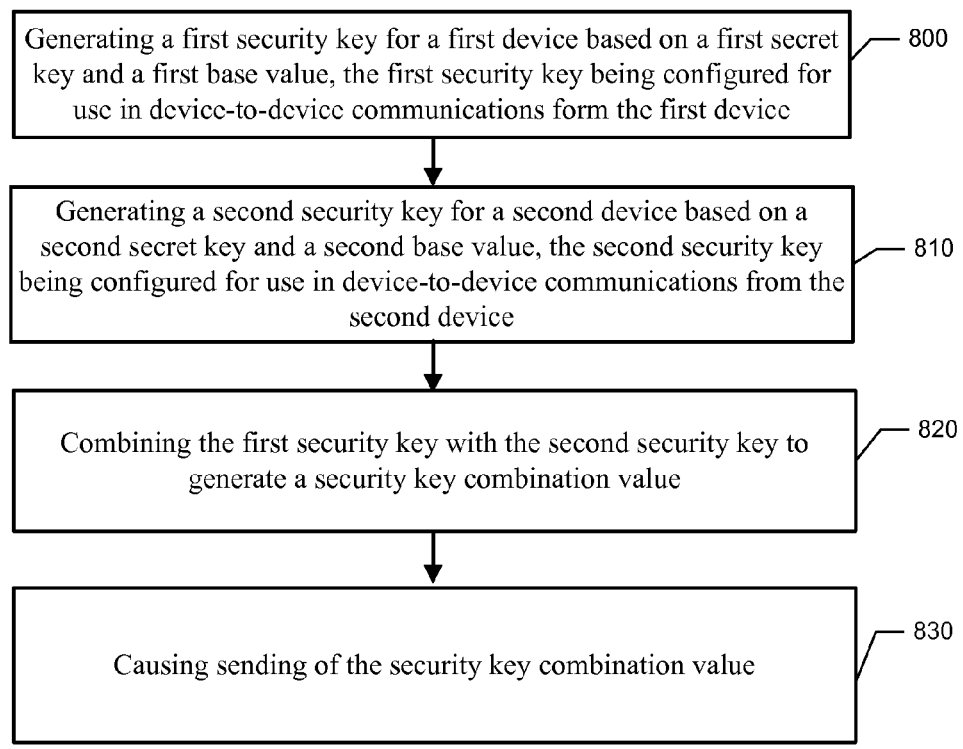
FIG. 8 illustrates a flow chart of another method for device-to-device key management according to an example embodiment of the present invention.
Figure 9:
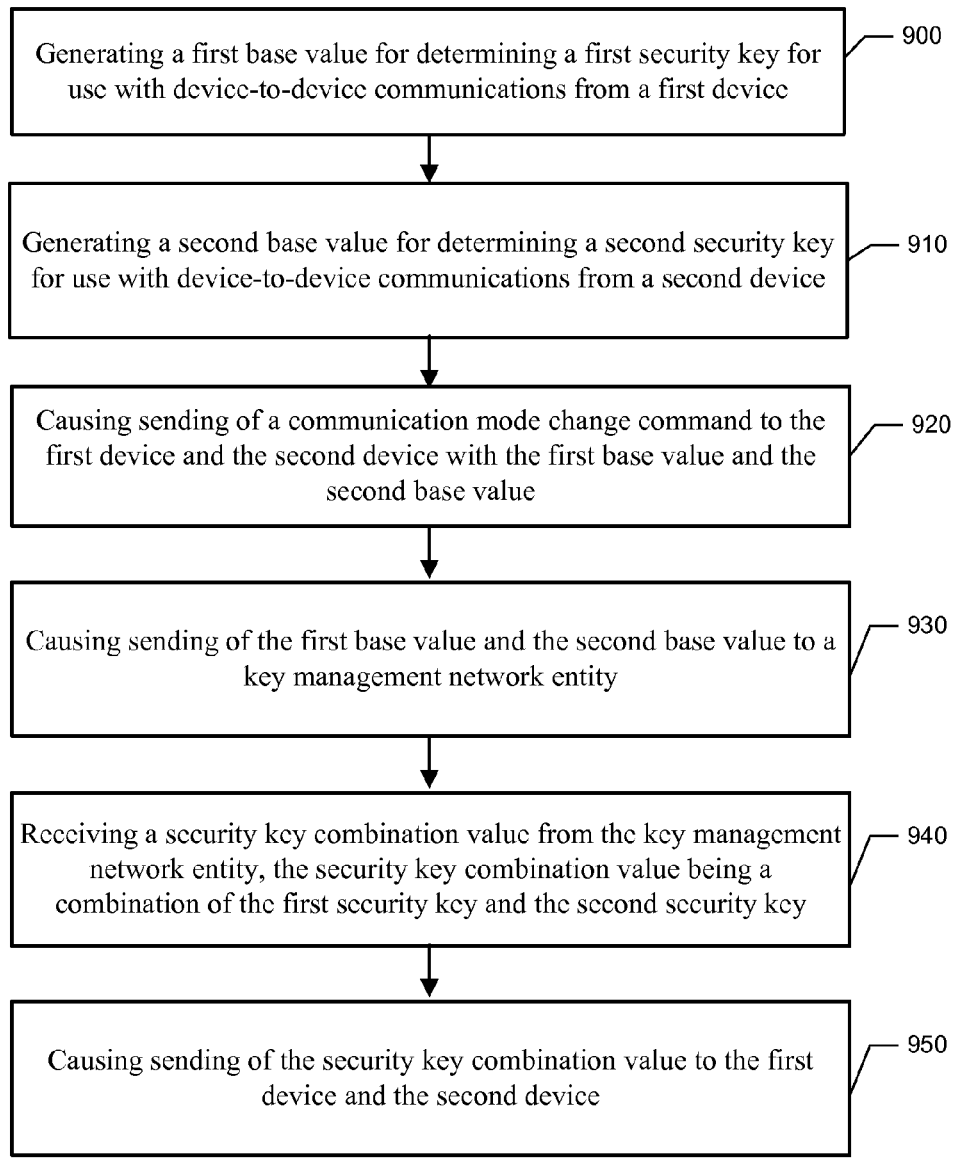
FIG. 9 illustrates a flow chart of another method for device-to-device key management according to an example embodiment of the present invention.

Further, for example, with reference to FIG. 8, when the D2D key manager 540 is configured to cause the apparatus 500 to operate as a key management network entity, such as MME 110, D2D key manager 540 may be configured to perform the following functionality. In this regard, the D2D key manager 540 may be configured to generate a first security key for a first device (e.g., mobile terminal 150a) based on a first secret key for the first device and a first base value at 800. The first security key may be configured for use in device-to-device communications from the first device. The D2D key manager 540 may also be configured to generate a second security key for a second device (e.g., mobile terminal 150b) based on a second secret key for the second device and a second base value at 810. The second security key may also be configured for use in device-to-device communications from the second device. The D2D key manager 540 may be further configured to combine the first security key with the second security key to generate a security key combination value at 820, and cause sending of the security key combination value at 830.

In some example embodiments, the D2D key manager 540 may be configured to generate the first security key based on the first base value and generate the second security key based on the second base value, where the first base value is a first random or pseudo-random number associated with the first device and the second base value is a second random or pseudo-random number associated with the second device. In some example embodiments, the D2D key manager 540 may be configured to receive the first base value from the first device, and receive the second base value from the second device. Alternatively, in some example embodiments, the D2D key manager 540 may be configured to generate the first base value and the second base value. Further, in some example embodiments, the D2D key manager 540 may be configured to combine the first security key with the second security key through an exclusive-or operation. According to some example embodiments, the D2D key manager 540 may be configured to cause sending of the security key combination value to the first device and the second device for deconstruction, or to an access point. In some example embodiments, the D2D key manager 540 may be configured to receive a request for the first security key and the second security key, and cause sending of the first base value, the second base value, and the security key combination value to an access point. Further, for example, with reference to FIG. 9, when the D2D key manager 540 is configured to cause the apparatus 500 to operate as an access point, such as eNB 120, D2D key manager 540 may be configured to perform the following functionality. In this regard, the D2D key manager 540 may be configured to generate a first base value for determining a first security key for use with device-to-device communications from a first device at 900, generate a second base value for determining a second security key for use with device-to-device communications from a second device at 910, and cause sending of a communication mode change command to the first device and the second device with the first base value and the second base value at 920. Further the D2D key manager 540 may be configured to cause sending of the first base value and the second base value to a key management network entity at 930, and receive a security key combination value from the key management network entity, where the security key combination value is a combination of the first security key and the second security key. Further, the D2D key manager 540 may be configured to cause sending of the security key combination value to the first device and the second device at 950.

In some example embodiments, the D2D key manager 540 may be configured to cause sending of a first communication mode change command with the first base value in an individualized message for the first device, and cause sending of a second communication mode change command with the second base value in an individualized message for the second device. Further, in some example embodiments, the D2D key manager 540 may also be configured to cause sending of the security key combination value via a dedicated and secure connection with the first device, and cause sending of the security key combination value via a dedicated and secure connection with the second device.

Referring now to FIG. 6, a more specific example apparatus in accordance with various embodiments of the present invention is provided. The example apparatus of FIG. 6 is a mobile terminal 10 configured to communicate within a wireless network, such as a cellular communications network. The mobile terminal 10 may be configured to perform the functionality of the mobile terminals 150 and/or apparatus 500 as described herein.

More specifically, the mobile terminal 10 may be caused to perform the functionality described with respect to mobile terminals 150 in FIGS. 1-4 and FIG. 7 via the processor 20. Processor 20 may be an integrated circuit or chip configured similar to the processor 205 together with, for example, the I/O interface 506. Further, volatile memory 40 and non-volatile memory 42 may configured to support the operation of the processor 20 as computer readable storage media.

The mobile terminal 10 may also include an antenna 12, a transmitter 14, and a receiver 16, which may be included as parts of a communications interface of the mobile terminal 10. The speaker 24, the microphone 26, the display 28 (which may be a touch screen display), and the keypad 30 may be included as parts of a user interface.

FIGS. 2-4 and 7-9 illustrate flowcharts of example systems, methods, and/or computer program products according to example embodiments of the invention. It will be understood that each operation of the flowcharts, and/or combinations of operations in the flowcharts, can be implemented by various means. Means for implementing the operations of the flowcharts, combinations of the operations in the flowchart, or other functionality of example embodiments of the present invention described herein may include hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions for performing the operations and functions of FIGS. 2-4 and 7-9 may be stored on a memory device, such as memory device 510, volatile memory 40, or volatile memory 42, of an example apparatus, such as example apparatus 500 or mobile terminal 10, and executed by a processor, such as the processor 505 or processor 20. As will be appreciated, any such program code instructions may be loaded onto a computer or other programmable apparatus (e.g., processor 505, memory device 510, or the like) from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the at least one processor, cause the apparatus at least to:
receive a communication mode change command requesting a mode change to device-to-device communications, a base value, and a security key combination value in a common message;
generate a local device security key based on a secret key and the base value, the local device security key being configured for use in device-to-device communications; and
deconstruct the security key combination value using the local device security key to determine a peer device security key, the peer device security key being configured for use in device-to-device communications.

2. The apparatus of claim 1, wherein the apparatus caused to generate the local device security key based on the secret key and the base value comprises being caused to generate the local device security key based on the secret key and the base value, wherein the base value is a random or pseudo-random number.

3. The apparatus of claim 1, wherein the apparatus is further caused to generate the base value.

4. The apparatus of claim 1, wherein the apparatus is further caused to:
generate the base value; and
cause sending of the base value to a key management network entity.

5. The apparatus of claim 1, wherein the apparatus caused to receive the security key combination value comprises being caused to receive the security key combination value from a mobility management entity.

6. The apparatus of claim 1, wherein the apparatus is further caused to:
generate the base value; and
cause sending of the base value to a key management network entity, the key management network entity being a mobility management entity.

7. The apparatus of claim 1, wherein the apparatus caused to deconstruct the security key combination value comprises being caused to implement an exclusive-or operation on the security key combination value to determine the peer device security key.

8. The apparatus of claim 1, wherein the apparatus caused to receive the security key combination value comprises being caused to receive the security key combination value via a secure connection with the sending entity, the secure connection being a dedicated connection between the sending entity and a receiving entity.

9. The apparatus of claim 1, wherein the apparatus is caused to receive the communication mode change command and the base value are received in a common message individualized for the receiving entity.

10. The apparatus of claim 1, wherein the apparatus is further caused to cipher outgoing device-to-device communications using the local device security key, and decipher incoming device-to-device communications using the peer device security key.

11. An apparatus comprising at least one processor and at least one memory including computer program code, the at least one memory and the computer program code configured to, with the at least one processor, cause the apparatus at least to:
generate a first security key for a first device based on a first secret key and a first base value, the first security key being configured for use in device-to-device communications from the first device;
generate a second security key for a second device based on a second secret key and a second base value, the second security key being configured for use in device-to-device communications from the second device;
combine the first security key with the second security key to generate a security key combination value; and
cause sending of the security key combination value.

12. The apparatus of claim 11, wherein the apparatus caused to generate the first security key based on the first base value and generate the second security key based on the second base value comprises being caused to generate the first security key based on the first base value and generate the second security key based on the second base value, wherein the first base value is a first random or pseudo-random number associated with the first device and the second base value is a second random or pseudo-random number associated with the second device.

13. The apparatus of claim 11, wherein the apparatus is further caused to receive the first base value from the first device, and receive the second base value from the second device.

14. The apparatus of claim 11, wherein the apparatus is further caused to generate the first base value and the second base value.

15. The apparatus of claim 11, wherein the apparatus caused to combine the first security key with the second security key includes being caused to combine the first security key with the second security key through an exclusive-or operation.

16. The apparatus of claim 11, wherein the apparatus caused to cause sending of the security key combination value comprises being caused to cause sending of the security key combination value to the first device and the second device for deconstruction, or to an access point.

17. The apparatus of claim 11, wherein the apparatus is further caused to:
receive a request for the first security key and the second security key; and
cause sending of the first base value, the second base value, and the security key combination value to an access point.

18. An apparatus comprising at least one processor and at least one memory including computer program code, the at least one memory and the computer program code configured to, with the at least one processor, cause the apparatus at least to:
generate a first base value for determining a first security key for use with device-to-device communications from a first device;
generate a second base value for determining a second security key for use with device-to-device communications from a second device;

cause sending of a communication mode change command to the first device and the second device with the first base value and the second base value;

cause sending of the first base value and the second base value to a key management network entity;

receive a security key combination value from the key management network entity, the security key combination value being a combination of the first security key and the second security key; and cause sending of the security key combination value to the first device and the second device.

19. The apparatus of claim 18, wherein the apparatus caused to cause sending of the communication mode change command to the first device and the second device comprises being caused to cause sending of a first communication mode change command with the first base value in an individualized message for the first device, and cause sending of a second communication mode change command with the second base value in an individualized message for the second device.

20. The apparatus of claim 18, wherein the apparatus caused to cause sending of the security key combination value to the first device and the second device comprises cause sending of the security key combination value via a dedicated and secure connection with the first device, and cause sending of the security key combination value via a dedicated and secure connection with the second device.

* * * * *